L. B. SHOOK.
TWINE HOLDER.
APPLICATION FILED JAN. 8, 1910.

961,032.

Patented June 7, 1910.

2 SHEETS—SHEET 1.

Witnesses
B. B. Galt.
James A. Koehl

Inventor
Lowell B. Shook.
By Victor J. Evans.
Attorney

L. B. SHOOK.
TWINE HOLDER.
APPLICATION FILED JAN. 8, 1910.

961,032.

Patented June 7, 1910.
2 SHEETS—SHEET 2.

Witnesses

Inventor
Lowell B. Shook.
By Victor J. Evans
Attorney

UNITED STATES PATENT OFFICE.

LOWELL B. SHOOK, OF RIVERSIDE, CALIFORNIA, ASSIGNOR OF ONE-FOURTH TO SOLOMON E. SHOOK, OF CUYAHOGA FALLS, OHIO.

TWINE-HOLDER.

961,032.  Specification of Letters Patent.  Patented June 7, 1910.

Application filed January 8, 1910. Serial No. 537,068.

*To all whom it may concern:*

Be it known that I, LOWELL B. SHOOK, a citizen of the United States of America, residing at Riverside, in the county of Riverside and State of California, have invented new and useful Improvements in Twine-Holders, of which the following is a specification.

This invention relates to twine holders, and has for an object to provide a device of this character in which the free end of the twine will be suspended normally at an elevation where it will not obstruct the arms in their movement during the operation of wrapping a package, means being employed whereby the twine can be conveniently grasped and pulled under tension to sufficiently unwind portions thereof from the spool but obviating an accumulation of slack in the twine.

Figure 1:
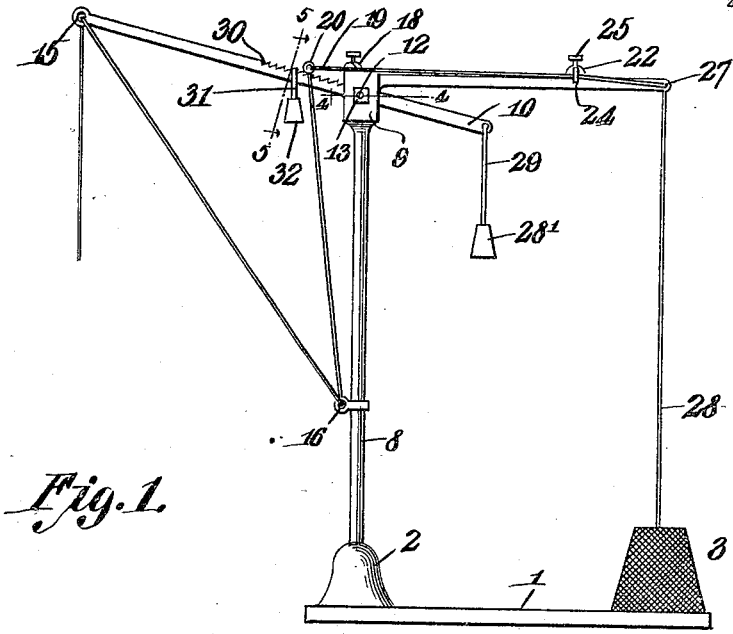
Figure 2:
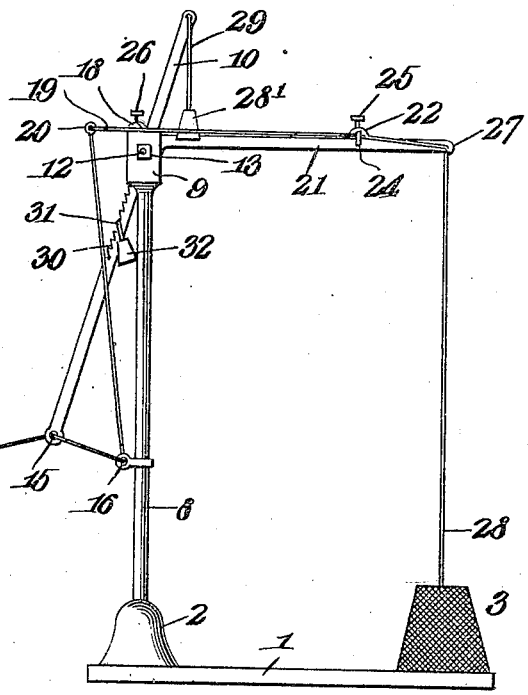
Figure 3:
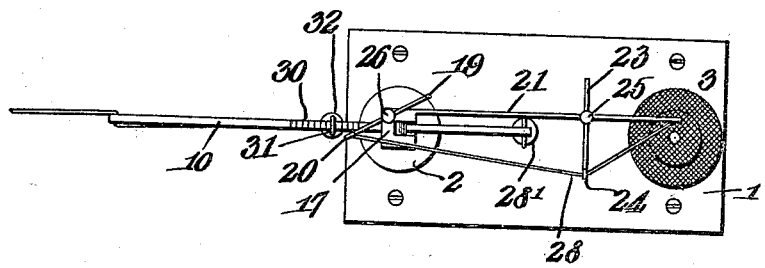
Figure 4:
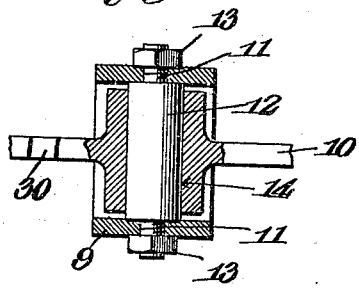
Figure 5:
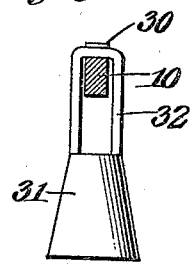
Figure 6:
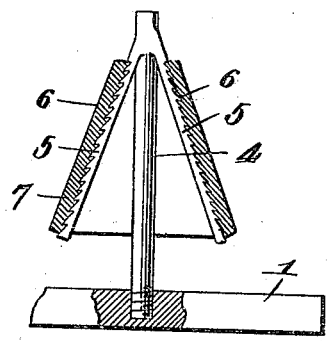

In the drawings, forming a portion of this specification and in which like numerals of reference indicate similar parts in the several views:—Figure 1 is a side elevation of my improved twine holder showing the twine-carrying arm in an elevated position. Fig. 2 is a similar view showing the twine-carrying arm in its lowered position. Fig. 3 is a top plan view of the holder. Fig. 4 is a detail transverse section taken on the line 4—4 of Fig. 1. Fig. 5 is a detail transverse section taken on the line 5—5 of Fig. 1. Fig. 6 is a detail vertical section taken through a portion of the base of the holder showing the spool retainer.

My improved twine holder consists of a base 1 upon which is mounted a member 2 of sufficient weight to hold the base accurately anchored upon the support upon which it is mounted. The base 1 is provided with a spool support 3 which consists of a vertical shank 4 which carries downwardly diverging jaws 5 whose outer surfaces are provided with downwardly extending spurs 6 adapted to bite into the walls of the spool 7 to hold it operatively positioned upon the base.

The member 2 supports a vertical standard 8 whose upper end is provided with a forked portion between the arms 9 of which is disposed a swinging arm 10. The arms 9 of the forked portion of the standard are formed with alining perforations for the reception of the reduced ends 11 of a bearing pin 12. The extremities of the ends 11 are threaded for the reception of clamping nuts 13 which may be moved into clamping engagement with the outer surfaces of the arms 9. The bearing 12 is disposed in a correspondingly formed aperture 14 in the arm 10. The arm 10 has its minor portion extended rearwardly of the standard 8 and its major portion extends forwardly of the said standard for a purpose to be hereinafter described. One end of the arm 10 is provided with a guide eye 15. The standard 8 is provided adjacent to the member 2 with a guide eye 16. The forked upper end of the standard 8 is provided with a head 17 upon which is formed a boss 18 apertured to slidably receive a rod 19 whose outer end is formed to provide a guide eye 20. A rod 21 extends rearwardly from the standard 8 and it is formed with a boss 22 which is apertured to slidably receive the rod 23. This rod is provided at one end with a guide eye 24. A set screw 25 is carried by the boss 22 and is adapted to be engaged with the rod 23 to hold it in its adjusted position. A similar set screw 26 is carried by the boss 18 and it is adapted to be engaged with the rod 19 to hold it in its adjusted position. The rear end of the rod 21 is provided with a guide eye 27. The spool is of conical form preferably and it has wound thereon the twine 28. This twine is threaded first through the eye 27 and then through the eye 24 and then through the eyes 20, 16 and 14 and the free end of the twine depends from the outer extremity of the arm 10 to lie in convenient reach of the bundle wrapper or user of the device.

To normally hold the arm 10 in an elevated position as shown in Fig. 1, the minor portion of the arm is provided with a weight 28' which carries a rod 29 whose upper end is pivoted to the arm 10, as shown. The arm 10 is provided upon its major portion with a toothed surface 30 with which is adjustably engaged the bail 31 of a weight 32.

When the free depending portion of the twine which is suspended from the outer extremity of the arm 10 is pulled downwardly the arm 10 will be rocked on its pivot and the counterbalancing weight 28 will be moved to assume the position shown in Fig. 2 of the drawings. When the weight 28 is in this position the major portion of the arm and the weight 32 will be sufficient to counteract the effect of the weight 28 and the arm will be held in the position shown in Fig. 2. When the arm is in this position the twine can be pulled without effecting any movement of the arm. It will be seen that the novel arrangement of the guide eyes is such that sufficient tension is applied to the twine to prevent its being unwound too freely from its spool. The rods 19 and 23 can be adjusted on their supports to obtain the desired tension on the twine as will be understood. The construction of the spool support is such that the jaws 5 will under their spring tension be moved into gripping engagement with the walls of the spool to hold it against rotary or vertical movement on the base.

The construction of the device herein set forth and described is extremely simple and its use will permit the bundle wrapper to quickly tie a package. After the sufficient amount of twine has been used the free end which depends from the arm 10 may be given a slight upward jerk to move the said arm to its normal position where the free end of the twine will be again moved to a position where it cannot form an obstruction upon the counter or other support upon which the article is mounted.

I claim:—

1. A twine holder comprising a pivoted arm, a supporting standard for the arm, said arm having its minor portion extended rearwardly of the standard and its major portion extended forwardly of the standard, a weight mounted upon the minor portion of the arm for rocking the arm so that its major portion will extend upwardly and away from the standard, an adjustable weight upon the major portion of the arm, a spool support for the twine, and a plurality of guide eyes arranged to guide the twine, one of the said eyes being located at the outer extremity of the major portion of the pivoted arm so that the free end of the twine will be suspended therefrom and held normally in an elevated position.

2. A twine holder comprising a standard, an arm pivoted on the standard and adapted for vertical movement, said arm having its minor portion extended rearwardly of the standard and having its major portion extended forwardly of the standard and provided at its outer end with a guide eye, a guide eye located on the standard, an adjustable guide eye-carrying rod at the upper end of the standard, a rearwardly extending arm mounted upon the standard, an adjustable guide eye-carrying rod mounted upon the said arm, a spool support for the twine, the twine being threaded through the said guide eye so that the free end of the twine is suspended from the outer extremity of the major portion of the arm, a weight upon the minor portion of the arm for normally holding the arm in position whereby the guide eye at the outer extremity of the major portion of the arm is disposed upwardly and away from the standard, and an adjustable weight upon the major portion of the arm adapted to coöperate with the major portion to hold the arm in position to cause the guide eye thereof to lie downwardly and adjacent to the standard during removal of the twine.

In testimony whereof I affix my signature in presence of two witnesses.

LOWELL B. SHOOK.

Witnesses:
IRA D. FLUKE,
R. D. LAMAR.